United States Patent
Liu et al.

(10) Patent No.: US 11,922,853 B2
(45) Date of Patent: Mar. 5, 2024

(54) DISPLAY DEVICE, METHOD AND SYSTEM FOR DISPLAYING IMAGE THEREOF, AND STORAGE MEDIUM

(71) Applicants: Beijing BOE Optoelectronics Technology Co., Ltd., Beijing (CN); BOE Technology Group Co., Ltd., Beijing (CN)

(72) Inventors: Bingxin Liu, Beijing (CN); Feng Zi, Beijing (CN); Binhua Sun, Beijing (CN); Jiyang Shao, Beijing (CN); Feng Gao, Beijing (CN)

(73) Assignees: Beijing BOE Optoelectronics Technology Co., Ltd., Beijing (CN); BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 17/790,751

(22) PCT Filed: Aug. 4, 2021

(86) PCT No.: PCT/CN2021/110636
§ 371 (c)(1),
(2) Date: Jul. 4, 2022

(87) PCT Pub. No.: WO2022/062697
PCT Pub. Date: Mar. 31, 2022

(65) Prior Publication Data
US 2023/0046660 A1    Feb. 16, 2023

(30) Foreign Application Priority Data
Sep. 23, 2020   (CN) .......................... 202011011864.5

(51) Int. Cl.
G09G 3/20         (2006.01)
G06F 1/16         (2006.01)

(52) U.S. Cl.
CPC ........... *G09G 3/2092* (2013.01); *G06F 1/163* (2013.01); *G09G 2320/0673* (2013.01);
(Continued)

(58) Field of Classification Search
None
See application file for complete search history.

(56) References Cited

U.S. PATENT DOCUMENTS

2008/0018569 A1   1/2008   Sung et al.
2008/0284775 A1   11/2008  Shen et al.
(Continued)

FOREIGN PATENT DOCUMENTS

CN   102549649 A   7/2012
CN   103493122 A   1/2014
(Continued)

OTHER PUBLICATIONS

CN202011011864.5 first office action.
(Continued)

*Primary Examiner* — Ifedayo B Iluyomade
(74) *Attorney, Agent, or Firm* — IPro, PLLC

(57) ABSTRACT

Provided is a display device. The display device includes a controller, a display module, and a temperature sensor disposed in the display module; wherein the controller is connected to the display module and the temperature sensor; the temperature sensor is configured to detect a temperature of the display module; and the controller is configured to: adjust a gamma parameter of the display module to a target gamma parameter corresponding to the temperature of the display module; determine a target drive voltage required by the display module with the target gamma parameter; and drive, based on the target drive voltage, the display module to display an image.

17 Claims, 3 Drawing Sheets

(52) U.S. Cl.
CPC . *G09G 2330/028* (2013.01); *G09G 2330/045* (2013.01); *G09G 2360/04* (2013.01)

(56) References Cited

U.S. PATENT DOCUMENTS

| | | | |
|---|---|---|---|
| 2010/0277519 | A1 | 11/2010 | Lee |
| 2012/0212520 | A1* | 8/2012 | Matsui ................. G09G 3/3611 |
| | | | 345/101 |
| 2012/0281008 | A1 | 11/2012 | Marcu et al. |
| 2016/0012763 | A1 | 1/2016 | Chen et al. |
| 2018/0084257 | A1* | 3/2018 | Abbas .................. H04N 19/176 |
| 2018/0096650 | A1 | 4/2018 | Pyeon |
| 2019/0164475 | A1 | 5/2019 | Zhao |

FOREIGN PATENT DOCUMENTS

| | | | | |
|---|---|---|---|---|
| CN | 105632449 | A | | 6/2016 |
| CN | 106548751 | A | | 3/2017 |
| CN | 106875889 | A | | 6/2017 |
| CN | 106898289 | A | | 6/2017 |
| CN | 107886903 | A | | 4/2018 |
| CN | 109683315 | A | | 4/2019 |
| CN | 110111724 | A | | 8/2019 |
| CN | 112073774 | | * 8/2019 | ....... H04N 21/42204 |
| CN | 110491350 | A | | 11/2019 |
| CN | 110767148 | A | | 2/2020 |
| CN | 112150982 | A | | 12/2020 |

OTHER PUBLICATIONS

CN202011011864.5 second office action.
CN202011011864.5 Decision of rejection.
CN202011011864.5 Notification to grant patent right for invention.

* cited by examiner

DISPLAY DEVICE, METHOD AND SYSTEM FOR DISPLAYING IMAGE THEREOF, AND STORAGE MEDIUM

CROSS-REFERENCE TO RELATED APPLICATION

This application is a U.S. national stage of international application No. PCT/CN2021/110636, filed on Aug. 4, 2021, which claims priority to Chinese Patent Application No. 202011011864.5 filed on Sep. 23, 2020, and entitled "DISPLAY DEVICE, IMAGE DISPLAY METHOD AND SYSTEM THEREOF, AND STORAGE MEDIUM," and the disclosures of which are herein incorporated by references in their entireties.

TECHNICAL FIELD

The present disclosure relates to the field of display technologies, and in particular, relates to a display device, a method and system for displaying an image thereof, and a storage medium.

BACKGROUND

A wearable display device is a portable display device that can be worn or integrated with a cloth or accessory of a user. The user may wear the wearable display device, and watch movies or play games through the wearable display device.

SUMMARY

Embodiments of the present disclosure provide a display device, a method and system for displaying an image thereof, and a storage medium. The technical solutions are as follows.

In one aspect, a display device is provided. The display device includes: a controller, a display module, and a temperature sensor disposed in the display module; wherein the controller is connected to the display module and the temperature sensor;
the temperature sensor is configured to detect a temperature of the display module; and
the controller is configured to:
adjust a gamma parameter of the display module to a target gamma parameter corresponding to the temperature of the display module;
determine a target drive voltage required by the display module with the target gamma parameter; and
drive, based on the target drive voltage, the display module to display an image.

Optionally, a corresponding relationship of a temperature range and the gamma parameter is stored in the controller; and the controller is further configured to:
determine a target temperature range of the temperature of the display module; and
determine a target gamma parameter corresponding to the target temperature range based on the corresponding relationship.

Optionally, the corresponding relationship includes 12 temperature ranges and 12 gamma parameters in one to one correspondence to the 12 temperature ranges.

Optionally, the display device is a wearable display device, and further includes a data interface; wherein
the data interface is configured to receive a display signal from a mobile terminal, and send the display signal to the controller; and
the controller is configured to control, based on the display signal, the display module to display the image.

Optionally, the display device further includes: a signal conversion circuit, wherein the signal conversion circuit is connected to the data interface and the controller; wherein
the data interface is configured to receive the display signal from the mobile terminal, and send the display signal to the signal conversion circuit;
the controller is configured to control the signal conversion circuit to convert the display signal to a mobile industry processor interface signal, and send the mobile industry processor interface signal to the display module; and
the display module is configured to display the image in response to the mobile industry processor interface signal.

Optionally, the data interface is further configured to be connected to the mobile terminal.

Optionally, the display device further includes: a power supply circuit, wherein the power supply circuit is connected to the data interface, the display module, and the controller; and
the power supply circuit is configured to supply power to the display module and the controller in response to driving by a power source signal transmitted by the data interface.

Optionally, the display device further includes: a drive board;
wherein the controller, and the signal conversion circuit, the data interface, and the power supply circuit in the display device are disposed on the drive board.

Optionally, the controller is further configured to send a temperature detect instruction to the temperature sensor; and
the temperature sensor is configured to detect the temperature of the display module in response to the temperature detect instruction.

In another aspect, a method for displaying an image on the display device is provided. The method includes:
adjusting a gamma parameter of a display module to a target gamma parameter corresponding to a temperature of the display module;
determining a target drive voltage required by the display module with the target gamma parameter; and
driving, based on the target drive voltage, the display module to display the image.

Optionally, prior to adjusting the gamma parameter of the display module to the target gamma parameter corresponding to the temperature of the display module, the method further includes:
determining a target temperature range of the temperature of the display module; and
determining a target gamma parameter corresponding to the target temperature range based on a corresponding relationship of a temperature range and the gamma parameter.

Optionally, the corresponding relationship includes 12 temperature ranges and 12 gamma parameters in one to one correspondence to the 12 temperature ranges.

Optionally, the display device is a wearable display device; and the method further includes:
receiving a display signal from a mobile terminal; and
controlling, based on the display signal, the display module to display the image.

In another aspect, a non-transitory computer-readable storage medium is provided. The computer-readable storage medium stores instructions therein, wherein the instructions, when run on a computer, causes the computer to perform the method for displaying an image on the display device according to above aspect.

In still another aspect, a system for display an image is provided. The system for display an image includes: a mobile terminal, and the display device according to above aspect;

wherein a communication connection is established between the mobile terminal and the display device.

In still another aspect, a computer program product including instructions is provided. The computer, when running the instructions, is caused to perform the method for displaying an image on the display device according to above aspect.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages in the present disclosure, the embodiments of the present disclosure are described in detail hereinafter in combination with the accompanying drawings.

In the related art, a wearable display device includes a display module. The display module may be configured to display an image for viewing of a user. In addition, due to less luminescence efficiency of the display module of the wearable display device, a drive voltage of the display module of the wearable display device needs to be improved to ensure luminance of the image viewed by the user.

However, greater drive voltage of the display module may cause higher temperature of the display module, such that the display module is prone to be damaged.

Generally, the luminescence efficiency of the display module of the wearable display device is less. In the case that the luminance of the display module of the wearable display device is 1000 nit, the luminance received by human eyes is merely 150 nit, or less than 150 nit. For the wearable display device, the luminance of 150 nit is smallest luminance of the display module viewable by the human eyes, such that the experience of the user is poor. In addition, in the case that the luminance of the display module is greater than 800 nit, the temperature of the display module is higher, and the display module is prone to be damaged.

Figure 1:
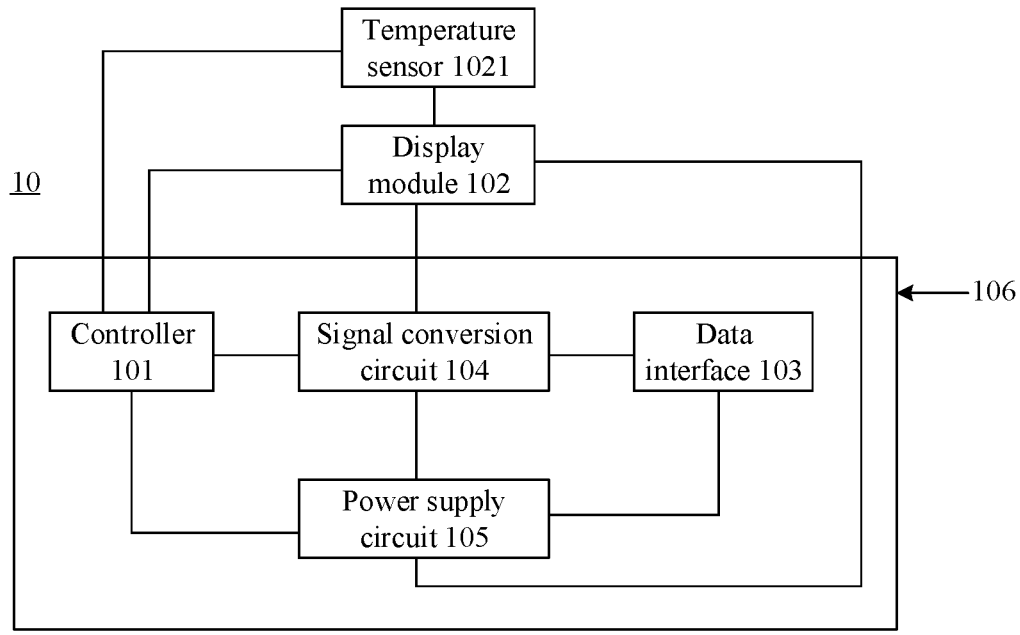
FIG. 1 is a schematic structural diagram of a display device according to an embodiment of the present disclosure.

FIG. 1 is a schematic structural diagram of a display device according to an embodiment of the present disclosure. Referring to FIG. 1, it can be seen that the display device 10 may include a controller 101, a display module 102, and a temperature sensor 1021 disposed in the display module 102. The controller 101 may be connected to the display module 102 and the temperature sensor 1021.

The temperature sensor 1021 may be configured to detect a temperature of the display module 102. The controller 101 may be configured to: adjust a gamma parameter of the display module 102 to a target gamma parameter corresponding to the temperature of the display module 102; determine a target drive voltage required by the display module 102 with the target gamma parameter; and drive, based on the target drive voltage, the display module 102 to display an image.

The gamma parameter may be configured to represent a curvilinear relationship of the luminance output by the display module 102 and the drive voltage input by the display module 102. In the development process, a set of configuration array of registers in the drive integrated circuit (driver IC) determines a source drive circuit of a pixel. In the case that the drive circuits are different, display luminance of the pixels are different. In addition, display results of the registers with different values for the same frame image causes different luminance of the display module 102. That is, for different gamma parameters, luminance of the display module 102 are different in the case that the drive voltages provided to the display module 102 are equal.

In the embodiments of the present disclosure, the display module 102 may have one initial gamma parameter. In the case that the temperature of the display module 102 is higher, the initial gamma parameter may be adjusted to the target gamma parameter, such that the drive voltage required by the display module 102 is decreased without obvious change of the luminance of the display module 102, and the temperature of the display module 102 is further decreased. Therefore, a possibility of the damage of the display module 102 is decreased. The initial gamma parameter of the display module 102 may be predetermined for the display module 102 by the controller 101.

Prior to adjusting the initial gamma parameter to the target gamma parameter, the luminance of the display module 102 may be a first luminance. After the display module 102 is driven based on the target gamma parameter to display the image, the luminance of the display module 102 may be a second luminance. The second luminance is less than or equal to the first luminance, and a difference of the first luminance and the second luminance is less than a luminance threshold. That is, after the initial gamma parameter is adjusted to the target gamma parameter, the luminance of the display module 102 may be decreased slightly. As the human eyes cannot recognize the slight change of the luminance, the slight decrease of the luminance may not affect the display effect of the display module.

In summary, a display device is provided in the embodiments of the present disclosure. The controller of the display device may adjust the gamma parameter in the case that the temperature of the display module is high, such that the drive voltage required by the display module is decreased on the premise that the luminance of the display module changes slightly. In this way, the temperature of the display module may be decreased to avoid damage of the display module, and the reliability of the display device is greater.

In the embodiments of the present disclosure, the controller 101 may send a temperature detect instruction to the temperature sensor 1021. The temperature sensor 1021 may detect the temperature of the display module 102 in response to the temperature detect instruction. The temperature sensor 1021 detects the temperature of the display module 102 when receiving the temperature detect instruction from the controller 101, and the temperature sensor 1021 is not necessary to detect the temperature of the display module 102 when not receiving the temperature detect instruction from the controller 101, such that the power dissipation of the display device 10 may be decreased.

Optionally, the controller 101 may send the temperature detect instruction to the temperature sensor 1021 once at an interval, such that the temperature sensor 1021 detects the temperature of the display module 102 once at an interval. The interval may be pre-stored in the controller 101, and may be set as by the user based on the actual case. The temperature sensor 1021 may automatically detect the temperature of the display module 102 without the control of the controller 101, which is not limited in the embodiments of the present disclosure.

In the embodiments of the present disclosure, the controller 101 may store a corresponding relationship of a temperature range and the gamma parameter. The controller 101 may be further configured to determine a target temperature range of the temperature of the display module 102, and determine a target gamma parameter corresponding to the target temperature range based on the corresponding relationship.

Referring to FIG. 1, the corresponding relationship includes 12 temperature ranges and 12 gamma parameters in one to one correspondence to the 12 temperature ranges. By setting more temperature ranges and more gamma parameters, the accuracy of the target gamma parameter determined based on the corresponding relationship may be ensured, such that the display effect of the display device is further ensured.

TABLE 1

| Sequence number | Temperature range | Gamma parameter |
| --- | --- | --- |
| 1 | T ≤ 55° C. | Gamma1 |
| 2 | 55° C. ≤ T < 57° C. | Gamma2 |
| 3 | 57° C. ≤ T < 59° C. | Gamma3 |
| 4 | 59° C. ≤ T < 61° C. | Gamma4 |
| 5 | 61° C. ≤ T < 63° C. | Gamma5 |
| 6 | 63° C. ≤ T < 65° C. | Gamma6 |
| 7 | 65° C. ≤ T < 67° C. | Gamma7 |
| 8 | 67° C. ≤ T < 69° C. | Gamma8 |
| 9 | 69° C. ≤ T < 71° C. | Gamma9 |
| 10 | 71° C. ≤ T < 73° C. | Gamma10 |
| 11 | 73° C. ≤ T < 75° C. | Gamma11 |
| 12 | T ≥ 75° C. | Gamma12 |

Referring to Table 1, in the case that the temperature of the display module 102 is less than or equal to 55° C., the corresponding gamma parameter is Gamma1. In the case that the temperature of the display module 102 is greater than or equal to 60° C. and is less than 65° C., the corresponding gamma parameter is Gamma6. In the case that the temperature of the display module 102 is greater than or equal to 75° C., the corresponding gamma parameter is Gamma12.

In the embodiments of the present disclosure, in the case that the display device 10 is launched, the temperature of the display module 102 may be lower, such as, less than or equal to 55° C. Based on Table 1, the controller may determine that the target gamma parameter corresponding to the temperature of the display module 102 is Gamma1. In this case, the drive voltage of the display module 102 may be greater, and the luminance of the display module 102 may be greater, such as 1000 nit. The temperature of the display module 102 is increasing with increasing of the display time of the display module 102.

In the case that the temperature of the display module 102 is within a lower temperature range (such as a temperature range of the 12 temperature ranges in Table 1), the luminance of the display module 102 may be changed dynamically. In addition, the luminance of the display module 102 is negatively correlated with the temperature of the display module 102. That is, the higher the temperature of the display module 102, the less the luminance of the display module 102. The lower the temperature of the display module 102, the greater the luminance of the display module 102.

In the case that the temperature of the display module 102 is increased gradually (for example, increased to 56° C.), that is, the temperature is within the temperature range with the sequence number of 2, the controller 101 may determine that the target gamma parameter corresponding to the temperature of the display module 102 is Gamma2. In the case that the temperature of the display module 102 is further increased (for example, increased to 58° C.), that is, the temperature is within the temperature range with the sequence number of 3, the controller 101 may determine that the target gamma parameter corresponding to the temperature of the display module 102 is Gamma3, and so on, which is not repeated in the embodiments of the present disclosure.

In the case that the temperature of the display module 102 is greater than or equal to 75° C., the display module 102 is at risk of burning out. Therefore, the controller 101 may determine that the target gamma parameter corresponding to the temperature of the display module 102 is Gamma2, such that the drive voltage of the display module 102 may be decreased, and the temperature of the display module 102 may be decreased. In the case that the temperature of the display module 102 is decreased, the temperature of the display module 102 required by the controller 101 next time is within the temperature range with any sequence number of 1 to 11. Therefore, the target gamma parameter corresponding to the temperature of the display module 102 may be adjusted again to increase the drive voltage of the display module 102, such that the luminance of the display module 102 is increased. That is, the gamma parameter of the display module 102 in the display device in the embodiments of the present disclosure may be adjusted dynamically, such that the display module 102 has dynamical display luminance in the safe temperature ranges.

Optionally, the display device may be a wearable display device, such as, a virtual reality (VR) device, or an augmented reality (AR) device. Referring to FIG. 1, the display device 10 may include a data interface 103.

A mobile terminal may send a display signal to the data interface 103 in the display device 10. The data interface 103 may be configured to receive the display signal from the mobile terminal, and send the display signal to the controller 101. After receiving the display signal, the controller 101 may control, based on the display signal, the display module 102 to display the image.

In the embodiments of the present disclosure, a communication connection is established between the mobile terminal and the display device 10. Optionally, the display device 10 may be connected to the mobile terminal by a data cable. For example, the data cable may be inset into the data interface 103 to connect the display device 10 and the mobile terminal. Or, the display device 10 may be in wireless connection to the mobile terminal. Optionally, the data interface 103 may be a type-C interface.

Referring to FIG. 1, the display device 10 may further include a signal conversion circuit 104. The signal conversion circuit may be connected to the data interface 103 and the controller 101.

After receiving the display signal from the mobile terminal, the data interface 103 may send the display signal to the signal conversion circuit 104. The display signal may be a display port (DP) signal. The controller 101 may control the signal conversion circuit 104 to convert the display signal to a mobile industry processor interface (MIPI) signal. The signal conversion circuit 104 may send the MIPI signal to the display module 102. The controller 101 may control the display module 102 to display the image in response to the MIPI signal.

In the embodiments of the present disclosure, prior to displaying the image by the display module 102, the controller 101 may configure the signal conversion circuit 104, such that the signal conversion circuit 104 may have a function of converting the DP signal to the MIPI signal, and the display module 102 displays the image in response to the MIPI signal. Therefore, the controller 101 controls the display module 102 to display the image by controlling the signal conversion circuit 104.

Referring to FIG. 1, the display device 10 may further include a power supply circuit 105. The power supply circuit 105 may be connected to the data interface 103, the display module 102, and the controller 101. The power supply circuit 105 may be configured to supply power to the display module 102 and the controller 101 in response to driving by a power source signal transmitted by the data interface 103.

As the display device 10 is in wired connection to the mobile terminal by the data interface 103, and the data interface 103 is connected to the power supply circuit 105, the power source signal of the mobile terminal may be transmitted to the power supply circuit 105 of the display device by the data interface 103. In addition, the power supply circuit 105 may be connected to the display module 102 and the controller 101, and thus, the power supply circuit 105 may transmit the acquired power source signal to the display module 102 and the controller 101, so as to supply power to the display module 102 and the controller 101. That is, in this case, the display module 102 and the controller 101 in the display device may be supplied power by the external mobile terminal.

The power supply circuit 10 may store the electrical energy. In the case that the display device 10 is in wireless connection to the mobile terminal, and the power source signal of the mobile terminal cannot transmit to the display device, the power supply circuit 105 may supply power to the display module 102 and the controller 101.

Referring to FIG. 1, the display device 10 may further include a drive board 106. The controller 101, the signal conversion circuit 104, the data interface 103, and the power supply circuit 105 are disposed on the drive board 106. By disposing the controller 101, the signal conversion circuit 104, the data interface 103, and the power supply circuit 105 on the drive board 106, a relative movement of the devices may be avoided, such that the reliability and the stability of the connection between the devices may be ensured.

In the embodiments of the present disclosure, the mobile terminal may send a video source to the data interface 103. After the data interface 103 receives the video source, the controller 101 may write an initial parameter of the video source into the display module 102, such that the display module 102 displays the image of the video source. In addition, the controller 101 may configure an extended display identification data (EDID).

In summary, a display device is provided in the embodiments of the present disclosure. The controller of the display device may adjust the gamma parameter in the case that the temperature of the display module is high, such that the drive voltage required by the display module is decreased on the premise that the luminance of the display module changes slightly. In this way, the temperature of the display module may be decreased to avoid damage of the display module, and the reliability of the display device is greater.

Figure 2:
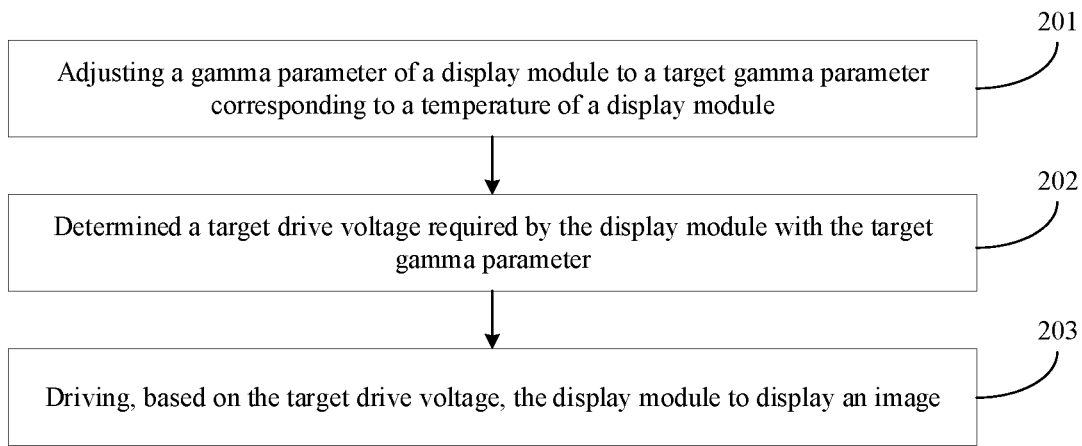
FIG. 2 is a flowchart of a method for displaying an image on the display device according to an embodiment of the present disclosure.

FIG. 2 is a flowchart of a method for displaying an image on the display device according to an embodiment of the present disclosure. The method may be applicable to the display device 10 according to above embodiments. Referring to FIG. 2, the method may include the following processes.

In S201, a gamma parameter of a display module is adjusted to a target gamma parameter corresponding to a temperature of the display module.

In the embodiments of the present disclosure, the display module may have one initial gamma parameter. With the initial gamma parameter, the temperature of the display module may be increased gradually with the increasing of the display time of the display module. In the case that the temperature of the display module is high, the initial gamma parameter may be adjusted to a target gamma parameter corresponding to a target temperature, such that the drive voltage of the display module is decreased without obvious effect on the luminance of the display module. The initial gamma parameter of the display module may be predetermined for the display module.

In S202, a target drive voltage required by the display module is determined with the target gamma parameter.

In the embodiments of the present disclosure, in the case that the gamma parameter of the display module is determined, the luminance of the display module is positively correlated with the drive voltage. That is, the greater the drive voltage, the greater the luminance of the display module. The less the drive voltage, the less the luminance of the display module.

In the target gamma parameter and the initial gamma parameter are same, and the luminance of the display module is same, the drive voltages required by the display module are different. In addition, the drive voltage required by the display module with the target gamma parameter is less than the drive voltage required by the display module with the initial gamma parameter. That is, after the initial gamma parameter is adjusted to the target gamma parameter, the target drive voltage required by the display module may be less.

In S203, the display module is driven based on the target drive voltage to display the image.

In the embodiments of the present disclosure, the target drive voltage is less, and thus the temperature of the display module may be decreased in the case that the display device drive, based on the target drive voltage, the display module to display the image, such that the display module is avoided damage.

Prior to adjusting the initial gamma parameter to the target gamma parameter, the luminance of the display module may be a first luminance. After driving, based on the target gamma parameter, the display module to display the image, the luminance of the display module may be a second luminance. The second luminance is less than or equal to the first luminance, and a difference of the first luminance and the second luminance is less than a luminance threshold. That is, after adjusting the initial gamma parameter to the target gamma parameter, the luminance of the display module may be decreased slightly. Due to the change of the luminance is not obvious, and the human eyes cannot recognize, the slight decrease of the luminance may not affect the display effect of the display module.

In summary, a method for displaying an image on the display device is provided in the embodiments of the present disclosure. The display device may adjust the gamma parameter in the case that the temperature of the display module is high, such that the drive voltage required by the display module is decreased on the premise that the luminance of the display module changes slightly. In this way, the temperature of the display module may be decreased to avoid damage of the display module, and the reliability of the display device is greater.

Figure 3:
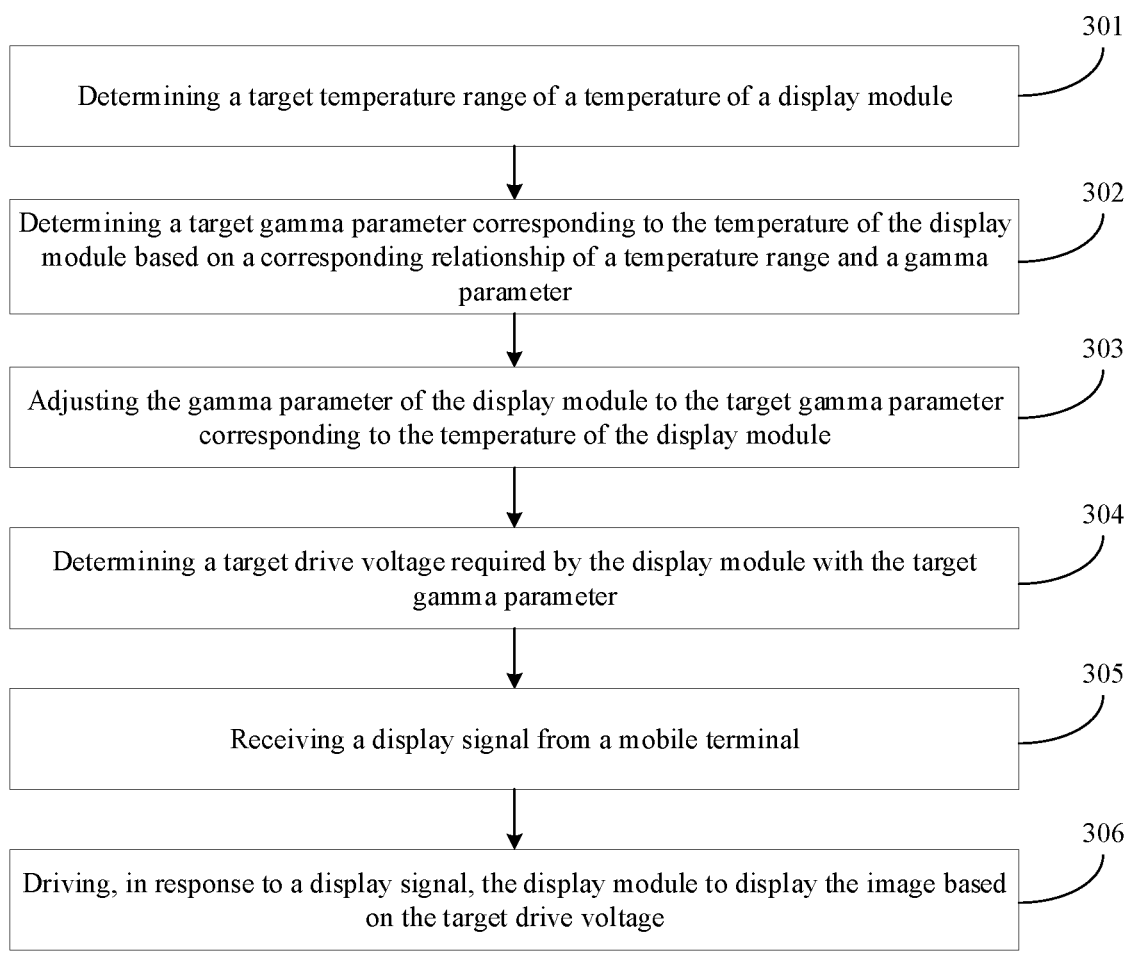
FIG. 3 is a flowchart of another method for displaying an image on the display device according to an embodiment of the present disclosure.

FIG. 3 is a flowchart of another method for displaying an image on the display device according to an embodiment of the present disclosure. The method may be applicable to the display device 10 according to above embodiments. Referring to FIG. 3, the method may include the following processes.

In S301, a target temperature range of the temperature of the display module is determined.

In the embodiments of the present disclosure, the temperature sensor in the display device may be configured to detect the temperature of the display module. The controller in the display device may acquire the temperature of the display module from the temperature sensor. In addition, the controller may further pre-store a plurality of temperature ranges. The controller may determine the temperature range of the temperature of the display module based on the temperature of the display module and the plurality of temperature ranges, and determine the temperature range of the temperature of the display module as the target temperature range.

Illustratively, assuming that 12 temperature ranges are pre-stored in the controller, and the 12 temperature ranges are the temperature ranges in Table 1, in the case that the temperature of the display module acquired by the controller from the temperature sensor is 70° C., the controller may determine, based on the temperature of the display module (70° C.) and the 12 temperature ranges in Table 1, that the temperature range of the temperature of the display module is the temperature range with the sequence number of 9. That is, the temperature range with the sequence number of 9 is the target temperature range.

In S302, a target gamma parameter corresponding to the temperature of the display module is determined based on a corresponding relationship of a temperature range and the gamma parameter.

In the embodiments of the present disclosure, the controller may store the corresponding relationship of the temperature range and the gamma parameter. For example, referring to Table 1, the corresponding relationship may include 12 temperature ranges and 12 gamma parameters in one to one correspondence to the 12 temperature ranges. By setting more temperature ranges and more gamma parameters, the accuracy of the target gamma parameter determined based on the corresponding relationship may be ensured, such that the display effect of the display device is further ensured.

After determining the target temperature range of the display module by S301, the controller may determine the target gamma parameter corresponding to the target temperature range based on the corresponding relationship.

Illustratively, the controller may determine the gamma parameter gamma9 corresponding to the target temperature range based on the Table 1 as the target gamma parameter in the case that the determined target temperature range is the temperature range with the sequence number of 9.

In S303, the gamma parameter of the display module is adjusted to the target gamma parameter corresponding to the temperature of the display module.

The description of S303 may be referred to the description of S201, which is not repeated in the embodiments of the present disclosure.

In S304, a target drive voltage required by the display module is determined with the target gamma parameter.

The description of S304 may be referred to the description of S202, which is not repeated in the embodiments of the present disclosure.

In S305, a display signal from a mobile terminal is received.

In the embodiments of the present disclosure, the display device may be a wearable display device, such as, a VR device, or an AR device. A communication connection may be established between the display device and the mobile terminal. The mobile terminal may send the display signal to the data interface in the display device. The data interface may receive the display signal from the mobile terminal, and send the display signal to the signal conversion circuit, such that the controller controls, based on the display signal received by the signal conversion circuit, the display module to display the image. The display signal may be a DP signal.

Optionally, the display device may be connected to the mobile terminal by a data cable. For example, the data cable may be inset into the data interface to connect the display device and the mobile terminal. Or, the display device may be in wireless connection to the mobile terminal.

In S306, the display module is driven, in response to the display signal, to display the image based on the target drive voltage.

In the embodiments of the present disclosure, the signal conversion circuit may convert the received DP signal to the MIPI signal. Then, the signal conversion circuit may send the MIPI signal to the display module. The controller may control, in response to the MIPI signal, to display the image based on the target drive voltage.

The other description of S306 may be referred to the description of S203, which is not repeated in the embodiments of the present disclosure.

Figure 4:
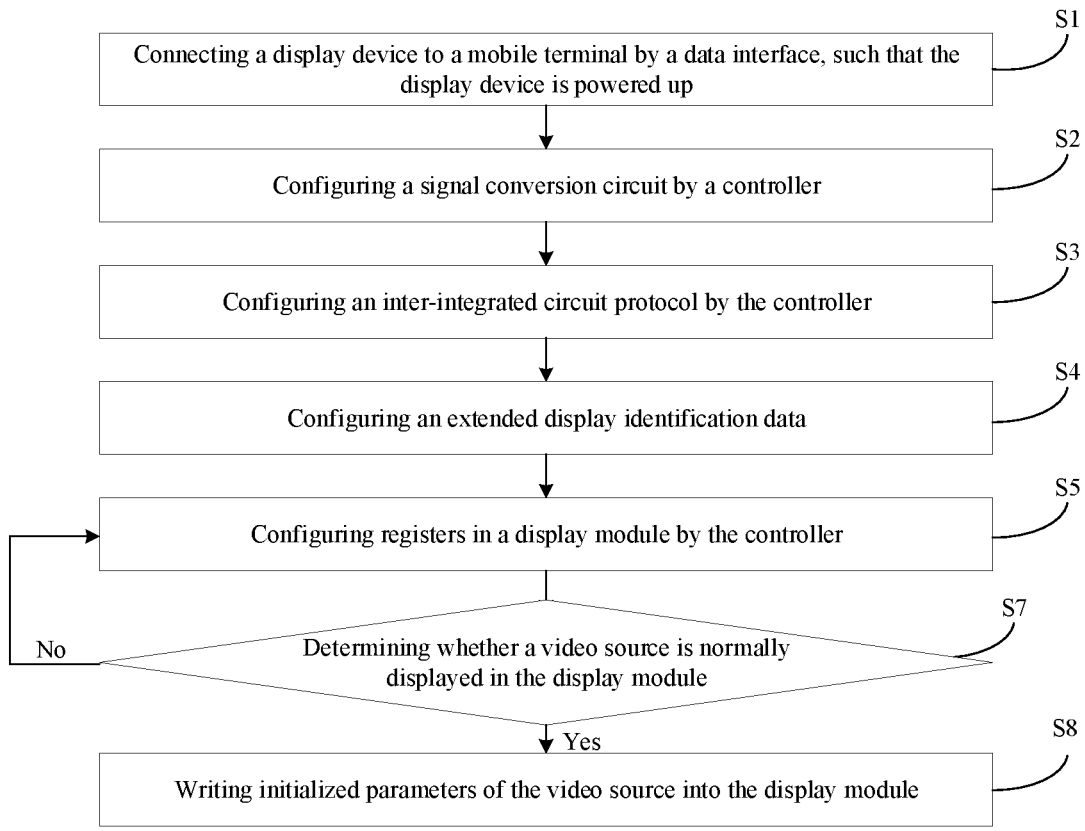
FIG. 4 is a flowchart of a configuration method according to an embodiment of the present disclosure.

In the embodiments of the present disclosure, referring to FIG. 4, prior to performing S301, the display device may perform the following processes.

In S1, the display device is connected to the mobile terminal by the data interface, such that the display device is powered up.

In S2, the controller configures the signal conversion circuit.

After configured by the controller, the signal conversion circuit may have a function of converting the DP signal to the MIPI signal, and the display module displays the image in response to the MIPI signal. Therefore, the controller controls the display module to display the image by controlling the signal conversion circuit.

In S3, the controller configures an inter-integrated circuit protocol.

The inter-integrated circuit (I2C) supports short distance communications of the devices, and the information exchange may be achieved by two signal lines. The I2C protocol is a bus standard in the micro-electronics communication control field.

In S4, the controller configures an extended display identification data (EDID).

The EDID is the standard related to the display module identification data established by the video electronics standards association (VESA) in establishing the direct digital control (DDC) display module identification data communication protocol. The EDID is stored in the memory of the DDC of the display module. In the case that the controller is connected to the display module, the controller may read the EDID stored in the memory of the DDC of the display module by a DDC channel.

In S5, the controller configures the registers in the display module.

The display module may include a plurality of registers, and the controller may initialize parameters stored in the plurality of registers.

In S6, whether the video source is normally displayed in the display module is determined.

In the case that the video source is normally displayed, S7 is performed. In the case that the video source is abnormally displayed, S5 is performed.

In S8, the controller writes initialized parameters of the video source into the display module.

After writing the initialized parameters of the video source into the display module, the display module may display the image of the video source under the control of the controller.

It should be noted that, in the embodiments of the present disclosure, the sequence of the processes of the method for displaying the image on the display device may be adjusted, and the processes may be added or deleted based on the actual case. For example, S301 and S302 may be deleted based on the actual case. Any variation methods within the technical scope of the present disclosure from persons skilled in the art should be included within the scope of protection of the present disclosure, and are not repeated.

In summary, a method for displaying an image on the display device is provided in the embodiments of the present disclosure. The controller of the display device may adjust the gamma parameter in the case that the temperature of the display module is high, such that the drive voltage required by the display module is decreased on the premise that the luminance of the display module changes slightly. In this way, the temperature of the display module may be decreased to avoid damage of the display module, and the reliability of the display device is greater.

A computer-readable storage medium is provided in the embodiments of the present disclosure. The computer-readable storage medium stores instructions therein, wherein the instructions stored in the computer-readable storage medium, when run on a computer, causes the computer to perform the method for displaying the image on the display device according to the above embodiments, for example, the method shown in FIG. 2 or FIG. 3.

A computer program product including instructions is provided. The computer, when running the instructions in the computer program product, is caused to perform the method for displaying an image on the display device according to the above embodiments, for example, the method shown in FIG. 2 or FIG. 3.

Figure 5:
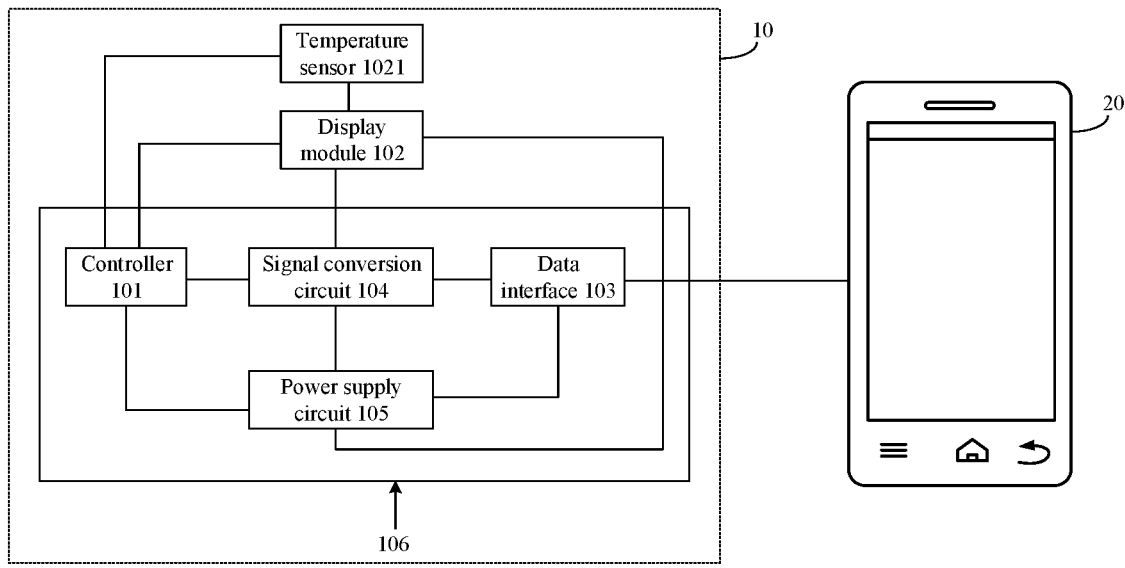
FIG. 5 is a schematic structural diagram of a display system according to an embodiment of the present disclosure.

FIG. 5 is a schematic structural diagram of a system for display an image according to an embodiment of the present disclosure. Referring to FIG. 2, the system for display the image may include: a mobile terminal 20 and the display device 10 according to the above embodiments. A communication connection is established between the mobile terminal 20 and the display device 10.

Optionally, the mobile terminal 20 may be connected to the display device 10 by a data cable. Or, the mobile terminal 20 may be in wireless connection to the display device 10.

The mobile terminal 20 may be a smart phone, a tablet computer, and the like.

Described above are example embodiments of the present disclosure, and are not intended to limit the present disclosure. Any modifications, equivalent replacements, improvements and the like made within the spirit and principles of the present disclosure should be included within the scope of protection of the present disclosure.

What is claimed is:

1. A display device, wherein the display device is a wearable display device, and comprises: a controller, a display module, a temperature sensor disposed in the display module, and a data interface; wherein
    the controller is connected to the display module and the temperature sensor;
    the temperature sensor is configured to detect a temperature of the display module;
    the data interface is configured to receive a display signal from a mobile terminal, and send the display signal to the controller; and
    the controller is configured to:
    adjust a gamma parameter of the display module to a target gamma parameter corresponding to the temperature of the display module;
    determine a target drive voltage required by the display module with the target gamma parameter; and
    drive, based on the display signal and the target drive voltage, the display module to display an image; wherein
    the display module has a preset initial gamma parameter, wherein a luminance of the display module corresponding to the initial gamma parameter is a first luminance, and a luminance of the display module corresponding to the target gamma parameter is a second luminance, a difference between the first luminance and the second luminance is less than a luminance threshold;
    the controller is further configured to: send a temperature detect instruction to the temperature sensor once at an interval, wherein the interval is pre-stored in the controller; and again adjust the target gamma parameter corresponding to the temperature of the display module in the case that the temperature of the display module is decreased and a temperature range which a temperature acquired by the controller at a current time is within is lower than a temperature range which a temperature acquired by the controller at a previous time is within, wherein a corresponding relationship of the temperature range and the gamma parameter is stored in the controller; and
    the temperature sensor is further configured to detect the temperature of the display module once at the interval in response to the temperature detect instruction.

2. The display device according to claim 1, wherein the controller is further configured to:
    determine a target temperature range of the temperature of the display module; and
    determine a target gamma parameter corresponding to the target temperature range based on the corresponding relationship.

3. The display device according to claim 2, wherein the corresponding relationship comprises 12 temperature ranges and 12 gamma parameters in one to one correspondence to the 12 temperature ranges.

4. The display device according to claim 1, further comprising: a signal conversion circuit, wherein the signal conversion circuit is connected to the data interface and the controller; wherein
the data interface is configured to receive the display signal from the mobile terminal, and send the display signal to the signal conversion circuit;
the controller is configured to control the signal conversion circuit to convert the display signal to a mobile industry processor interface signal, and send the mobile industry processor interface signal to the display module; and
the display module is configured to display the image in response to the mobile industry processor interface signal.

5. The display device according to claim 1, wherein the data interface is further configured to be connected to the mobile terminal.

6. The display device according to claim 5, further comprising: a power supply circuit, wherein
the power supply circuit is connected to the data interface, the display module, and the controller; and
the power supply circuit is configured to supply power to the display module and the controller in response to driving by a power source signal transmitted by the data interface.

7. The display device according to claim 4, further comprising: a drive board;
wherein the controller, and the signal conversion circuit, the data interface, and a power supply circuit in the display device are disposed on the drive board.

8. A method for displaying an image on a display device, wherein the display device is a wearable display device, and the method comprises:
adjusting a gamma parameter of a display module to a target gamma parameter corresponding to a temperature of the display module;
determining a target drive voltage required by the display module with the target gamma parameter; and
driving, based on the target drive voltage, the display module to display the image; and the method further comprises:
receiving a display signal from a mobile terminal; and
controlling, based on the display signal, the display module to display the image; wherein
the display module has a preset initial gamma parameter, wherein a luminance of the display module corresponding to the initial gamma parameter is a first luminance, and a luminance of the display module corresponding to the target gamma parameter is a second luminance, a difference between the first luminance and the second luminance is less than a luminance threshold;
the method further includes:
sending a temperature detect instruction to the temperature sensor once at an interval, wherein the interval is pre-stored in the controller;
detecting the temperature of the display module once at the interval in response to the temperature detect instruction; and
again adjusting the target gamma parameter corresponding to the temperature of the display module in the case that the temperature of the display module is decreased and a temperature range which a temperature acquired by the controller at a current time is within is lower than a temperature range which a temperature acquired by the controller at a previous time is within, wherein a corresponding relationship of the temperature range and the gamma parameter is stored in the controller.

9. The method according to claim 8, wherein prior to adjusting the gamma parameter of the display module to the target gamma parameter corresponding to the temperature of the display module, the method further comprises:
determining a target temperature range of the temperature of the display module; and
determining a target gamma parameter corresponding to the target temperature range based on a corresponding relationship of a temperature range and the gamma parameter.

10. The method according to claim 9, wherein the corresponding relationship comprises 12 temperature ranges and 12 gamma parameters in one to one correspondence to the 12 temperature ranges.

11. A non-transitory computer-readable storage medium storing instructions therein, wherein the instructions, when run on a computer, causes the computer to perform the method for displaying the image on the display device as defined in claim 8.

12. A system for display an image, comprising: a mobile terminal, and a display device, wherein the display device is a wearable display device, and comprises: a controller, a display module, a temperature sensor disposed in the display module, and a data interface; wherein
the controller is connected to the display module and the temperature sensor;
the temperature sensor is configured to detect a temperature of the display module;
the data interface is configured to receive a display signal from a mobile terminal, and send the display signal to the controller; and
the controller is configured to:
adjust a gamma parameter of the display module to a target gamma parameter corresponding to the temperature of the display module;
determine a target drive voltage required by the display module with the target gamma parameter; and
drive, based on the display signal and the target drive voltage, the display module to display an image;
wherein a communication connection is established between the mobile terminal and the display device,
the display module has a preset initial gamma parameter, wherein a luminance of the display module corresponding to the initial gamma parameter is a first luminance, and a luminance of the display module corresponding to the target gamma parameter is a second luminance, a difference between the first luminance and the second luminance is less than a luminance threshold;
the controller is further configured to: send a temperature detect instruction to the temperature sensor once at an interval, wherein the interval is pre-stored in the controller; and again adjust the target gamma parameter corresponding to the temperature of the display module in the case that the temperature of the display module is decreased and a temperature range which a temperature acquired by the controller at a current time is within is lower than a temperature range which a temperature acquired by the controller at a previous time is within, wherein a corresponding relationship of the temperature range and the gamma parameter is stored in the controller; and the temperature sensor is further configured to detect the temperature of the display module once at the interval in response to the temperature detect instruction.

13. The system according to claim 12, wherein
the controller is further configured to:
determine a target temperature range of the temperature of the display module; and
determine a target gamma parameter corresponding to the target temperature range based on the corresponding relationship.

14. The system according to claim 13, wherein the corresponding relationship comprises 12 temperature ranges and 12 gamma parameters in one to one correspondence to the 12 temperature ranges.

15. The system according to claim 12, wherein the display device is a wearable display device, and further comprises a data interface; wherein
the data interface is configured to receive a display signal from a mobile terminal, and send the display signal to the controller; and
the controller is configured to control, based on the display signal, the display module to display the image.

16. The system according to claim 15, further comprising:
a signal conversion circuit, wherein the signal conversion circuit is connected to the data interface and the controller; wherein
the data interface is configured to receive the display signal from the mobile terminal, and send the display signal to the signal conversion circuit;
the controller is configured to control the signal conversion circuit to convert the display signal to a mobile industry processor interface signal, and send the mobile industry processor interface signal to the display module; and
the display module is configured to display the image in response to the mobile industry processor interface signal.

17. The system according to claim 15, wherein the data interface is further configured to be connected to the mobile terminal.

* * * * *